US012472123B2

(12) United States Patent
Chen et al.

(10) Patent No.: US 12,472,123 B2
(45) Date of Patent: Nov. 18, 2025

(54) CHEST AND ABDOMEN COUPLED CARDIOPULMONARY RESUSCITATION DEVICE

(71) Applicants: QILU HOSPITAL OF SHANDONG UNIVERSITY, Shandong (CN); SHANDONG UNIVERSITY, Shandong (CN)

(72) Inventors: Yuguo Chen, Jinan (CN); Ke Li, Jinan (CN); Feng Xu, Jinan (CN); Jiali Wang, Jinan (CN); Jiaojiao Pang, Jinan (CN); Na Zhang, Jinan (CN); Mingze Sun, Jinan (CN)

(73) Assignees: QILU HOSPITAL OF SHANDONG UNIVERSITY, Jinan (CN); SHANDONG UNIVERSITY, Jinan (CN)

( * ) Notice: Subject to any disclaimer, the term of this patent is extended or adjusted under 35 U.S.C. 154(b) by 523 days.

(21) Appl. No.: 18/025,517

(22) PCT Filed: May 11, 2022

(86) PCT No.: PCT/CN2022/092252
§ 371 (c)(1),
(2) Date: Mar. 9, 2023

(87) PCT Pub. No.: WO2022/257691
PCT Pub. Date: Dec. 15, 2022

(65) Prior Publication Data
US 2023/0285229 A1 Sep. 14, 2023

(30) Foreign Application Priority Data
Jun. 9, 2021 (CN) ........................ 202110644561.5

(51) Int. Cl.
*A61H 31/00* (2006.01)

(52) U.S. Cl.
CPC ......... *A61H 31/006* (2013.01); *A61H 31/005* (2013.01); *A61H 2201/5071* (2013.01)

(58) Field of Classification Search
CPC .................................................... A61H 31/006
See application file for complete search history.

(56) References Cited

U.S. PATENT DOCUMENTS 11,974,961 B2 * 5/2024 Freeman ............ A61N 1/39044
2018/0008510 A1 * 1/2018 Lurie .................. A61H 31/006
(Continued)

FOREIGN PATENT DOCUMENTS

CN 203677513 U 7/2014
CN 104970958 A 10/2015
(Continued)

OTHER PUBLICATIONS

Jul. 28, 2022 International Search Report issued in International Patent Application No. PCT/CN2022/092252.
(Continued)

*Primary Examiner* — LaToya M Louis
(74) *Attorney, Agent, or Firm* — Oliff PLC

(57) ABSTRACT

A chest and abdomen coupled cardiopulmonary resuscitation device, including a bottom plate and at least two compression/traction mechanisms, wherein each of the two compression/traction mechanisms includes two linear motors with opposite positions, the axes of the two linear motors are perpendicular to the bottom plate, and the bottoms of the linear motors are in slip connection with the bottom plate; and the tops of the two linear motors are fixedly connected by a connecting mechanism, the bottom of the connecting mechanism is fixedly provided with a presser connected to an air pump, and the presser can move on the connecting mechanism along a direction perpendicular to the sliding direction of the linear motors. The device can be
(Continued)

adjusted to the optimal compression frequency, depth and duration according to objective physiological indicators, thereby greatly improving success rate of rescue.

7 Claims, 5 Drawing Sheets

(56) References Cited

U.S. PATENT DOCUMENTS

| | | | | |
|---|---|---|---|---|
| 2019/0021942 | A1* | 1/2019 | Wik | A61H 31/006 |
| 2020/0096319 | A1 | 3/2020 | Botero Rosas et al. | |
| 2022/0151866 | A1* | 5/2022 | Freeman | A61G 7/16 |
| 2022/0265509 | A1* | 8/2022 | Lurie | A61H 31/006 |

FOREIGN PATENT DOCUMENTS

| | | | |
|---|---|---|---|
| CN | 206482832 | U | 9/2017 |
| CN | 108279565 | A | 7/2018 |
| CN | 108670788 | A | 10/2018 |
| CN | 113274279 | A | 8/2021 |

OTHER PUBLICATIONS

Jul. 28, 2022 Written Opinion of the International Searching Authority issued in International Patent Application No. PCT/CN2022/092252.

* cited by examiner

CHEST AND ABDOMEN COUPLED CARDIOPULMONARY RESUSCITATION DEVICE

TECHNICAL FIELD

The present disclosure relates to the technical field of medical equipment, and more particularly to a chest and abdomen coupled cardiopulmonary resuscitation device.

BACKGROUND ART

The description in this section merely provides background information related to the present disclosure, and does not necessarily constitute the prior art.

Early high-quality cardiopulmonary resuscitation is the most critical link in a "resuscitation survival chain" for sudden cardiac arrest. However, due to the limitations of equipment, technology and other aspects, the rescue success rate for out-of-hospital cardiac arrest is less than 1%. The number of sudden deaths caused by sudden cardiac arrest in China ranks first in the world.

The inventor found that a cardiopulmonary resuscitation instrument is a type of efficient equipment in the treatment of sudden cardiac arrest. The cardiopulmonary resuscitation instrument has the advantages of high repeatability, strong stability of action output and high quality of cardiopulmonary resuscitation. However, the current cardiopulmonary resuscitation instruments all remain in the role of semi-automatic "chest compression instruments" without intelligence, leading to low success rate of rescue.

SUMMARY

In order to solve the shortcomings of the prior art, the present disclosure provides a chest and abdomen coupled cardiopulmonary resuscitation device, which allows to optimize its compression frequency, depth and duration according to objective physiological indicators, thereby greatly improving success rate of rescue.

To achieve the foregoing objective, the present disclosure uses the following technical solutions:

The first aspect of the present disclosure provides a chest and abdomen coupled cardiopulmonary resuscitation device.

The chest and abdomen coupled cardiopulmonary resuscitation device includes: a bottom plate and at least two compression/traction mechanisms, wherein each of the two compression/traction mechanisms includes two linear motors with opposite positions, the axes of the two linear motors are perpendicular to the bottom plate, and the bottoms of the linear motors are in slip connection with the bottom plate; and the tops of the two linear motors are fixedly connected by a connecting mechanism, the bottom of the connecting mechanism is fixedly provided with a presser connected to an air pump, and the presser can move on the connecting mechanism along a direction perpendicular to the sliding direction of the linear motors.

As an optional implementation, the compression/traction mechanisms include at least a first compression/traction mechanism and a second compression/traction mechanism which are arranged in parallel, the first compression/traction mechanism is configured to compress or lift a chest, and the second compression/traction mechanism is configured to compress or lift an abdomen.

As an optional implementation, each compression/traction mechanism includes a first linear motor and a second linear motor, and the connecting mechanism includes a first connecting piece, a second connecting piece, a first sliding connecting rod, a second sliding connecting rod and a box body;

- the top of the first linear motor is connected to a first end of the first connecting piece, the top of the second linear motor is connected to a first end of the second connecting piece, a second end of the first connecting piece is connected to one side of the box body through the first sliding connecting rod, and a second end of the second connecting piece is connected to the other side of the box body through the second sliding connecting rod; and
- the presser is arranged at the bottom of the box body and is communicated with the air pump in the box body.

Further, a first control terminal is arranged in the box body and is in communication connection with each linear motor, and a pressure sensor is arranged at the bottom of each presser and is in communication connection with the first control terminal.

Further, a second control terminal is arranged on the outer side of the box body and is in communication connection with the first control terminal, databases of hemodynamics, characteristic parameters of various physiological signals and chest and abdomen compression parameters for a plurality of patients with sudden cardiac arrest are integrated in the second control terminal, and when external physiological signals are input, compression parameters most suitable for a current patient can be obtained by comparison with the databases.

Further, the first control terminal is connected to each linear motor through a PWM (Pulse-Width Modulation) governor and is configured to control the speed of each linear motor to be consistent.

Further, the first control terminal uses a fuzzy adaptive intelligent controller to control the speed of the linear motor.

Further, a hybrid coding particle swarm optimization algorithm and a monitoring function are combined in the fuzzy adaptive intelligent controller, which includes the following steps:

- collecting an expected speed value and an actual speed value of the linear motor, with the purpose of minimizing a speed tracking error, taking a speed error and the rate of change of the error as the input of the fuzzy controller, and taking the control law as the output of the fuzzy controller; and
- using the hybrid coding particle swarm optimization algorithm to optimize a membership function, scale factor parameters and fuzzy rule conclusion, and outputting, by the fuzzy controller, control signals to change the speed of the linear motor and control the movement of the linear motor.

As an optional implementation, the presser is of a hollow spiral cylindrical structure; when a lifting function is performed, the air pump works, the interior of the presser is under negative pressure, the presser sticks to the chest or abdomen of a patient; and when the lifting force reaches three fifths of the last compression force of the presser, the air pump stops working.

The second aspect of the present disclosure provides a working method of the chest and abdomen coupled cardiopulmonary resuscitation device described in the first aspect, which is characterized by the following steps:

- step one. installing a cardiopulmonary resuscitation device, and selecting a chest and abdomen coupling mode or a chest pump mode or an abdomen pump mode;

step two. performing compression with the cardiopulmonary resuscitation device according to default parameters;

step three. determining whether there is external signal input, if yes, acquiring physiological parameters of a patient to match with database parameters stored in the device, and automatically adjusting the cardiopulmonary resuscitation device to compression parameters which are most suitable for the state of a patient at that time; if not, performing step five;

step four. calculating the pressure of a compression surface according to a pressure value fed back by the pressure sensor and a surface area of the presser, and if the pressure value is within a safety threshold value, performing next step; if the pressure value is not within the safety threshold value, after compression is performed according to the maximum compression parameters within the safety threshold value, performing the next step;

step five. continuing compression, and performing compression risk determination according to step four;

step six. returning to step three again every preset time;

step seven. determining whether compression is ended according to the received physiological parameters.

Compared with the prior art, the present disclosure has the following beneficial effects:

1. The present disclosure innovatively provides a chest compression and abdomen lifting coupled cardiopulmonary resuscitation device, which can be selected according to compression contraindications of patients, and can greatly increase the success rate of cardiopulmonary resuscitation.
2. The device disclosed by the present disclosure is provided with a plurality of multifunctional external interfaces, which allow the most appropriate compression parameters to be selected according to the physiological state of the patient for intelligent and accurate cardiopulmonary resuscitation.
3. The device disclosed by the present disclosure is provided with the pressure sensors, and the safety threshold value is set according to the pressure of the compression surface for avoiding rib injury.

The additional aspects and advantages of the present disclosure will be provided in the following description, some of which will become apparent from the following description or may be learned from practices of the present disclosure.

BRIEF DESCRIPTION OF THE DRAWINGS

The accompanying drawings constituting a part of the present disclosure are used to provide further understanding of the present disclosure. Exemplary embodiments of the present disclosure and descriptions thereof are used to explain the present disclosure, and do not constitute an improper limitation to the present disclosure.

Figure 1:
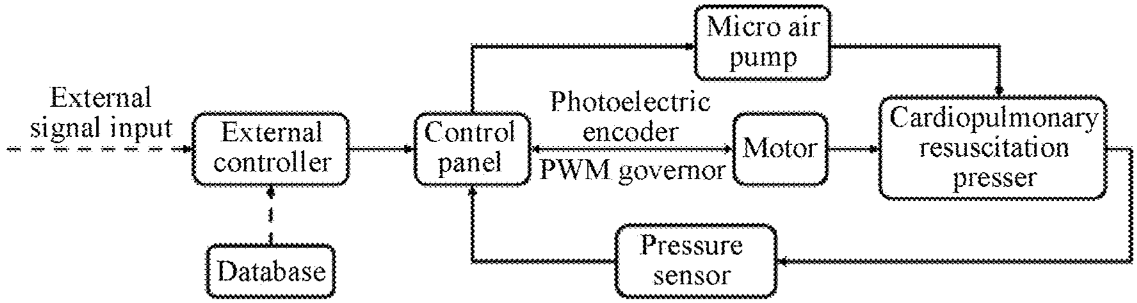
FIG. 1 is a system block diagram of a cardiopulmonary resuscitation device provided by Embodiment 1 of the present disclosure.

In the drawings: 1. device box; 2. linear motor; 3. bottom plate; 4. compression pump; 5. external controller; 6. sliding connecting rod; 7. near-end connecting rod; 8. sliding chute; 9. pressure sensor; 10. control panel; 11. micro air pump; 12. battery pack; 13. multifunctional interface; 14. display screen; 15. start key; 16. stop key; 17. pause key; and 18. initial key.

DETAILED DESCRIPTION

The present disclosure is further described below with reference to the accompanying drawings and embodiments.

It should be noted that, the following detailed descriptions are all exemplary, and are intended to provide further descriptions of the present disclosure. Unless otherwise specified, all technical and scientific terms used herein have the same meaning as commonly understood by a person of ordinary skill in the art to which the present disclosure belongs.

It should be noted that terms used herein are only for describing specific implementations and are not intended to limit exemplary implementations according to the present disclosure. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

The embodiments in the present disclosure and features in the embodiments may be mutually combined in case that no conflict occurs.

Embodiment 1

Embodiment 1 of the present disclosure provides a chest and abdomen coupled (detachable) three-dimensional cardiopulmonary resuscitation device for jointly performing chest compression and abdomen lifting, which includes a chest resuscitation main body, an abdomen resuscitation main body, a bottom plate, an external controller, etc. The chest resuscitation main body and the abdomen resuscitation main body have the same configuration, and mainly include driving motors, connecting rods, compression pumps, device boxes, etc.

The driving motors are linear motors. Four linear motors are totally included. Every two linear motors jointly drive one pump body to move. The linear motor is coaxially connected to the device box through near-end and sliding connecting rods. When the linear motor moves up (down), the near-end connecting rod is driven to move up (down), then the pump body is driven to move up (down), and thus, the compression function is realized by the up-and-down movement of the linear motor. Four photoelectric encoders are respectively installed on four linear motors for real-time detection and feedback of the movement speed of the motor. Further, a control panel adjusts the movement speed of the motor by changing the duty cycle of a signal through a pulse width modulation (PWM) governor. In addition, when the motor speeds detected by the four photoelectric encoders are inconsistent, compression is stopped immediately to prevent the movement disorder of the motors from causing the patient injury.

The compression pumps are divided into “the chest pump” and “the abdomen pump” according to compression positions. “The chest pump” can produce pressure gradients through compression to promote blood circulation to the maximum extent. “The abdomen pump” can drive a diaphragm to move up and down by lifting and compressing an abdomen, so that the volume of the chest is changed to cause pressure. On the contrary, the functions of “chest pump” lifting and abdomen compression can also be completed. The pressure difference of chest can be fully formed by using the chest and abdomen coupled cardiopulmonary resuscitation to promote blood circulation. Sliding chute design is adopted between the main body of the resuscitation device and the bottom plate, so that the main body of the resuscitation device can move back and forth. The main body of the resuscitation device can move left and right through the sliding connecting rods, so that the positions of “the chest pump” and “the abdomen pump” are adjusted according to the individual differences of patients, or only “the chest pump” or “the abdomen pump” is selected according to the contraindications of the patients. In addition, pressure sensors are respectively embedded at the bottoms of compression columns of “the chest pump” and “the abdomen pump” so as to measure the compression force and lifting force during cardiopulmonary resuscitation. Further, the pressure of a compression surface is calculated according to the pressure value fed back by the pressure sensor, and a safety threshold value is detected.

A control panel, a micro air pump, a battery and the like are arranged in the device box. The control panel can communicate with an external controller through a connecting line or Bluetooth, receives compression parameters input by the external controller, and then adjusts the movement speed of the motor. The micro air pump is configured to pump air in the presser to facilitate the adsorption of the presser, and only works when the chest and the abdomen are lifted. The battery is used for powering the micro air pump.

The external controller totally includes four buttons for controlling the compression process, a display screen capable of displaying external signals and the compression force and lifting force of the chest and abdomen, and 5 multifunctional external equipment interfaces. Large databases of hemodynamics, characteristic parameters of various physiological signals, and chest and abdomen compression parameters for 500 patients with sudden cardiac arrest are planned to be integrated in the external controller. When external physiological signals are input, an internal integrated learning algorithm can obtain compression parameters most suitable for the current patient by comparison with the databases. The data of patients successfully rescued by the chest and abdomen coupled cardiopulmonary resuscitation device will be automatically included in the database, and simultaneously transmitted to the hospital database cloud.

In addition, the chest and abdomen coupled cardiopulmonary resuscitation device in this embodiment has three power supply modes, batteries, commercial power and vehicle power supply, which can be freely selected according to the requirements of the scene. The batteries required for motor movement are laid inside the bottom plate, and can supply power for a long time.

A working method based on the described device includes the following steps:

the chest and abdomen coupled cardiopulmonary resuscitation device is worn, the positions of “the chest pump” and “the abdomen pump” and an initial compression point are adjusted according to the physical parameters of a patient (when a pressure value indicated by the pressure sensor is just greater than zero, the “initial key” can be used for realizing adjustment).

After the chest and abdomen coupled cardiopulmonary resuscitation device is started, “the chest pump” and “the abdomen pump” work at the same time according to the standard compression (compression frequency of 100 times/min, compression depth of 5 cm, compression-breathing ratio of 30:2) in an “up-down” movement mode. When the external signal input is detected, the chest and abdomen coupled cardiopulmonary resuscitation device collects characteristic parameters of an external signal every 10 seconds, compares the characteristic parameters with database signal parameters, and are then automatically adjusted to the compression parameters that are most suitable for the state of the patient at that time. Until parameter indicators of the patient tend to be normal, the chest and abdomen coupled cardiopulmonary resuscitation device stops working, thereby realizing intelligent and accurate cardiopulmonary resuscitation.

It is worth noting that when the control system detects that the pressure of the compression surface is greater than 5.65 pounds/square inch, the current compression is immediately stopped, and the maximum compression parameter in the previous safe state is selected for continuing compression.

Specifically, as shown in FIG. 1:

The designed control system of the cardiopulmonary resuscitation device includes a control panel, a photoelectric encoder, a PWM governor, a linear motor, chest and abdomen resuscitation pressers equipped with pressure sensors, a micro air pump, an external controller installed in database, and the like. The input of the external controller, the input of external signals, the inconsistent motor speeds and the pressure sensor value exceeding the safety threshold value will change the working mode of the control system.

Figure 2:
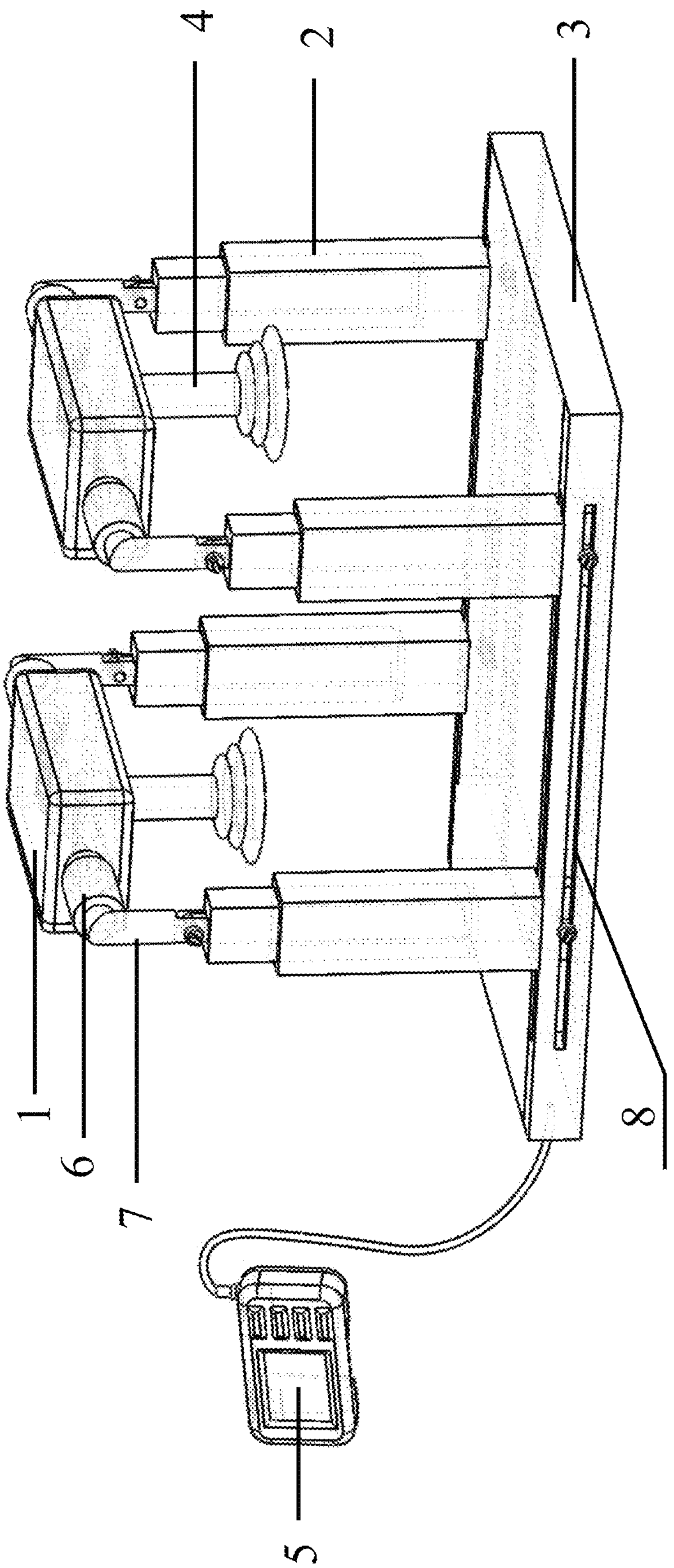
FIG. 2 is an overall structure of the cardiopulmonary resuscitation device provided by Embodiment 1 of the present disclosure.

As shown in FIG. 2, the chest and abdomen coupled (detachable) three-dimensional cardiopulmonary resuscitation device for chest compression and abdomen lifting mainly includes a device box 1, a linear motor 2, a bottom plate 3, a presser 4 and an external controller 5.

Sliding chutes 8 are provided at the lower ends of 4 linear motors 2, realizing distance adjustment in the front-back direction. The linear motors are fixed to the bottom plate 3 by rotating clamping slots; and the upper ends of the linear motors are connected to near-end connecting rods 7 by screws through holes. The near-end connecting rod 7, the sliding connecting rod 6 and the main body of the compression device are coaxially connected. The sliding connecting rod 6 is retractable to adjust the distance between the main body of the cardiopulmonary resuscitation device and the left and right sides. A joint between the near-end connecting rod 7 and one side of the sliding connecting rod 6 adopts a plug-in type shaft hole, so that the near-end connecting rod can be detached and rotated to facilitate the patient to lie down.

Figure 3:
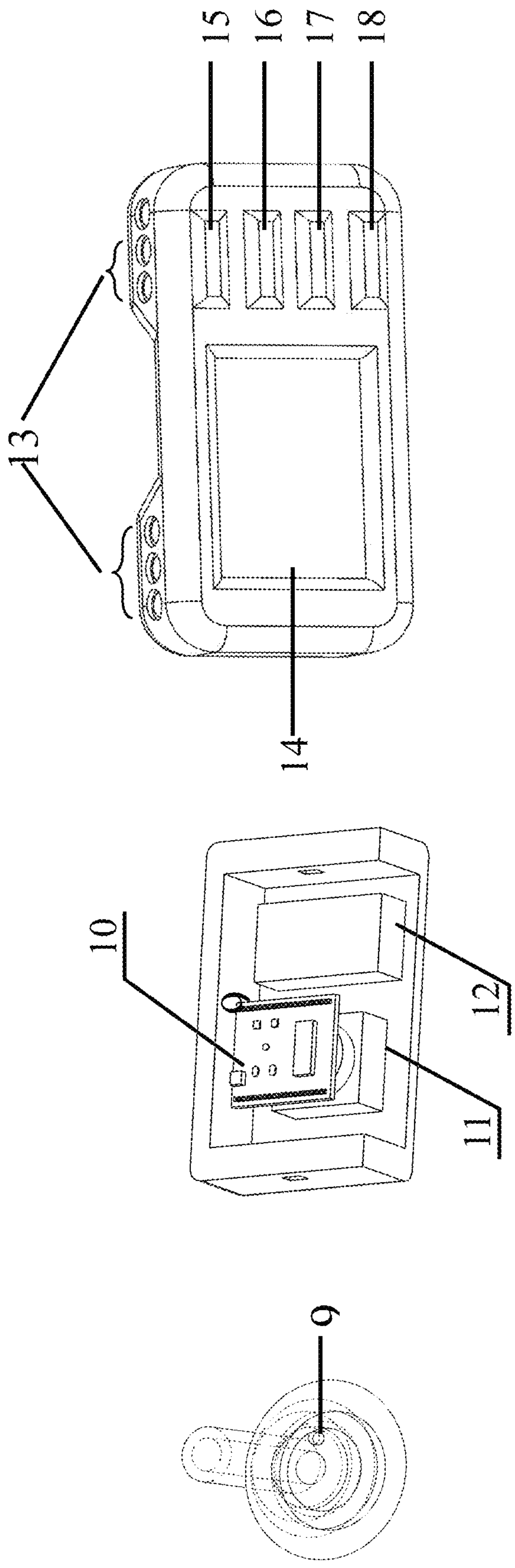
FIG. 3 is a detail structure diagram of the cardiopulmonary resuscitation device provided by Embodiment 1 of the present disclosure.

As shown FIG. 3, the chest and abdomen pressers 4 adopt the same design. The presser 4 has the functions of compression and lifting and is in a shape of a hollow spiral cylinder. The upper end of the presser is connected to the micro negative pressure pump 11. When a lifting function is performed, the micro negative pressure pump 11 works, the interior of the presser 4 is under negative pressure, the presser sticks to the chest or abdomen of the patient. When the lifting force reaches three fifths of the last compression pressure of the presser 4, the micro negative pressure pump stops 11 working. Two pressure sensors 9, which are piezoresistive thin-film pressure sensors, are respectively installed at the lower ends of the chest and abdomen pressers 4, and are used for measuring the compression force of the chest and abdomen and the lifting force of the abdomen. In addition to the micro negative pressure pump 11, the control panel 10 and the battery 12 are simultaneously installed in the chest and abdomen device boxes. At the same time, a Bluetooth module is integrated on the control panel 10 and is used for communication with the external controller.

Figure 5:
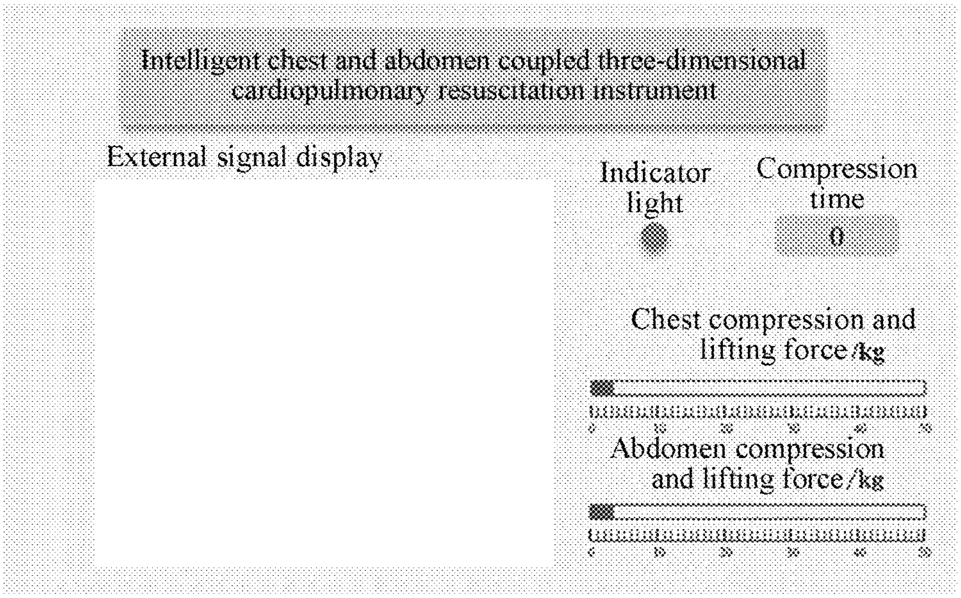
FIG. 5 is a display screen interface of an external controller provided by Embodiment 1 of the present disclosure.

The external controller 5 includes a multifunctional interface 13, a display screen 14, and four buttons i.e., a "start key" 15, a "stop key" 16, a "pause key" 17, and an "initial key" 18. The multifunctional interface 13 allows the external connection of multiple physiological equipment detectors and the acquisition of signals thereof. The display interface of the display screen 14 is shown in FIG. 5. The four function keys 15-18 are configured to start, stop and pause the compression movement and set the initial positions of the pressers. In addition, the external controller 5 is internally provided with a Bluetooth module, a WIFI module and an SD card storage module, which are convenient for signal input, data output and storage of new data.

Figure 4:
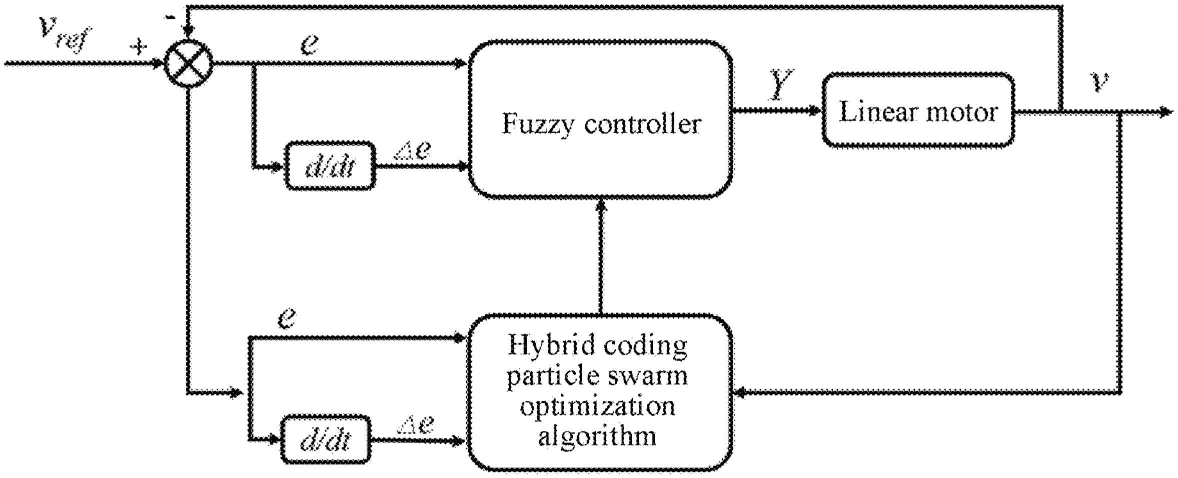
FIG. 4 is a block diagram of an adaptive fuzzy controller based on a multi-strategy co-evolution particle swarm optimization algorithm provided by Embodiment 1 of the present disclosure.

According to this embodiment, the fuzzy adaptive intelligent controller is used for controlling the speed of the linear motor. Referring to FIG. 4, which is a system block diagram of the fuzzy adaptive intelligent controller, in which the speed tracking error e is selected as the state variable of the system and is defined as follows:

$$e=v_{ref}-v \quad (1)$$

where $v_{ref}$ represents a reference speed, and v represents an actual movement speed. The rate of change of the speed error can be expressed as:

$$\dot{e}=\dot{v}_{ref}-\dot{v}) \quad (2).$$

The fuzzy controller adopts a Mamdani rule base structure, the language variable of which is expressed as follows:

$$R_i\text{: IF } x_1(k) \text{ is } A_{i1} \text{ and } x_2(k) \text{ is } A_{i2} \text{ and } \ldots \text{ and } x_m(k) \text{ is } A_{im} \quad (3)$$

$$\text{THEN } y(k) \text{ is } B_i$$

where i=1, 2, . . . l, $R_i$ represents the i-th rule. $x_j(k)$, j=1, 2, . . . n represents an input variable, and y(k) represents an output variable. $A_{ij}$ represents the membership function of the input variable (Gaussian type), and $B_i$ represents an output fuzzy set of the i-th fuzzy rule.

A center average defuzzification method is used to solve the fuzzification. The output of a fuzzy system is established by using single-valued fuzzy function and product reasoning:

$$Y=\frac{\sum_{i=1}^{l}\phi_i\prod_{j=1}^{n}A_{ij}(x_j)}{\sum_{i=1}^{l}\prod_{j=1}^{n}A_{ij}(x_j)}$$

where Φ represents a parameter variable.

The main idea of the adaptive intelligent controller is to learn Mamdani fuzzy rules adaptively and automatically through a hybrid coding particle swarm optimization (PSO) algorithm, so that the fuzzy controller can be adjusted adaptively to reduce a tracking error. The hybrid coding particle swarm optimization algorithm optimizes the membership function, scale factor parameters and fuzzy rule conclusions by combination with a special monitoring function and an adaptive threshold value.

The speed $V_i^{iter}$ and position $P_i^{iter}$ for the standard PSO algorithm are updated as follows:

$$\begin{cases} V_i^{iter+1}=\omega^{iter}V_i^{iter}+c_1r_1\left(P_{i,Best}^{iter}-P_i^{iter}\right)+c_2r_2\left(P_{Global}^{iter}-P_i^{iter}\right) \\ P_i^{iter+1}=P_i^{iter}+V_i^{iter+1} \\ iter=1{:}\mathrm{Max}It,\ i=1{:}N \end{cases}$$

where Max It represents the maximum number of iterations, and N represents the number of particles in swarm.

The membership function and the scale factor parameters can be adjusted by using the standard mechanism of PSO, but the expression method (integer) of fuzzy rules is not consistent with the mechanism of the particle swarm algorithm. To solve this problem, a monitoring function is introduced between the conclusion speed $V_i^{iter+1}$ and the position thereof, and the calculation formula of the monitoring function is as follows:

$$\phi\left(V_{i,j}^{iter+1},\tau_j^{iter}\right)=\frac{1}{2}\left(\frac{V_{i,j}^{iter+1}-\tau_j^{iter}}{\left|V_{i,j}^{iter+1}-\tau_j^{iter}\right|}+\frac{V_{i,j}^{iter+1}+\tau_j^{iter}}{\left|V_{i,j}^{iter+1}+\tau_j^{iter}\right|}\right)$$

$$\phi\left(V_{i,j}^{iter+1},\tau_j^{iter}\right)=\begin{cases} 1 & \text{if} \quad V_{i,j}^{iter+1}>\tau_j^{iter} \\ 0 & \text{if} \quad -\tau_j^{iter}<V_{i,j}^{iter+1}<\tau_j^{iter} \\ -1 & \text{if} \quad V_{i,j}^{iter+1}<\tau_j^{iter} \end{cases}$$

where a threshold value $\tau_j^{iter}$ changes dynamically in the optimization process, and the algorithm finds a new global optimum $P_{Global}^{iter}$ every time, and updates a mask vector M, $\tau_j^{iter}=M_j^{iter}$/iter. A new improved PSO algorithm can be obtained by combining the monitoring function with the PSO algorithm, and is dedicated to optimizing the conclusion of Mamdani fuzzy rules. The formula of the algorithm is as follows:

$$\begin{cases} V_i^{iter+1}=\omega^{iter}V_i^{iter}+c_1r_1\left(C_{i,Best}^{iter}-C_i^{iter}\right)+c_2r_2\left(C_{Global}^{iter}-C_i^{iter}\right) \\ C_i^{iter+1}=C_i^{iter}+\phi\left(V_i^{iter+1},\tau_j^{iter}\right) \\ j=1\ \ldots\ D,\ i=1\ \ldots\ N \end{cases}$$

where $C_{i,j}^{iter}$ represents a membership function selected in an output partition, and as the conclusion of the j-th fuzzy rule in the i-th fuzzy system, D represents the size of the fuzzy rule base.

In summary, the control system collects an expected speed value and an actual speed value of the linear motor, with the purpose of minimizing the speed tracking error, the speed error e and the rage of change of the error ė are taken as the input of the fuzzy controller, and the control law Y is taken as the output of the fuzzy controller. The hybrid coding particle swarm optimization algorithm is used for optimizing the membership function, scale factor parameters and fuzzy rule conclusion, thereby realizing the adaptability of the fuzzy controller. Finally, control signals are output by the fuzzy controller to change the speed of the linear motor and control the movement of the linear motor.

As shown in FIG. 5, the display interface of the display screen is designed. The display interface includes real-time display of chest compression pressure and abdomen lifting force, a real-time external signal display window (when there is external equipment), a compression risk indicator light and compression time.

Figure 6:
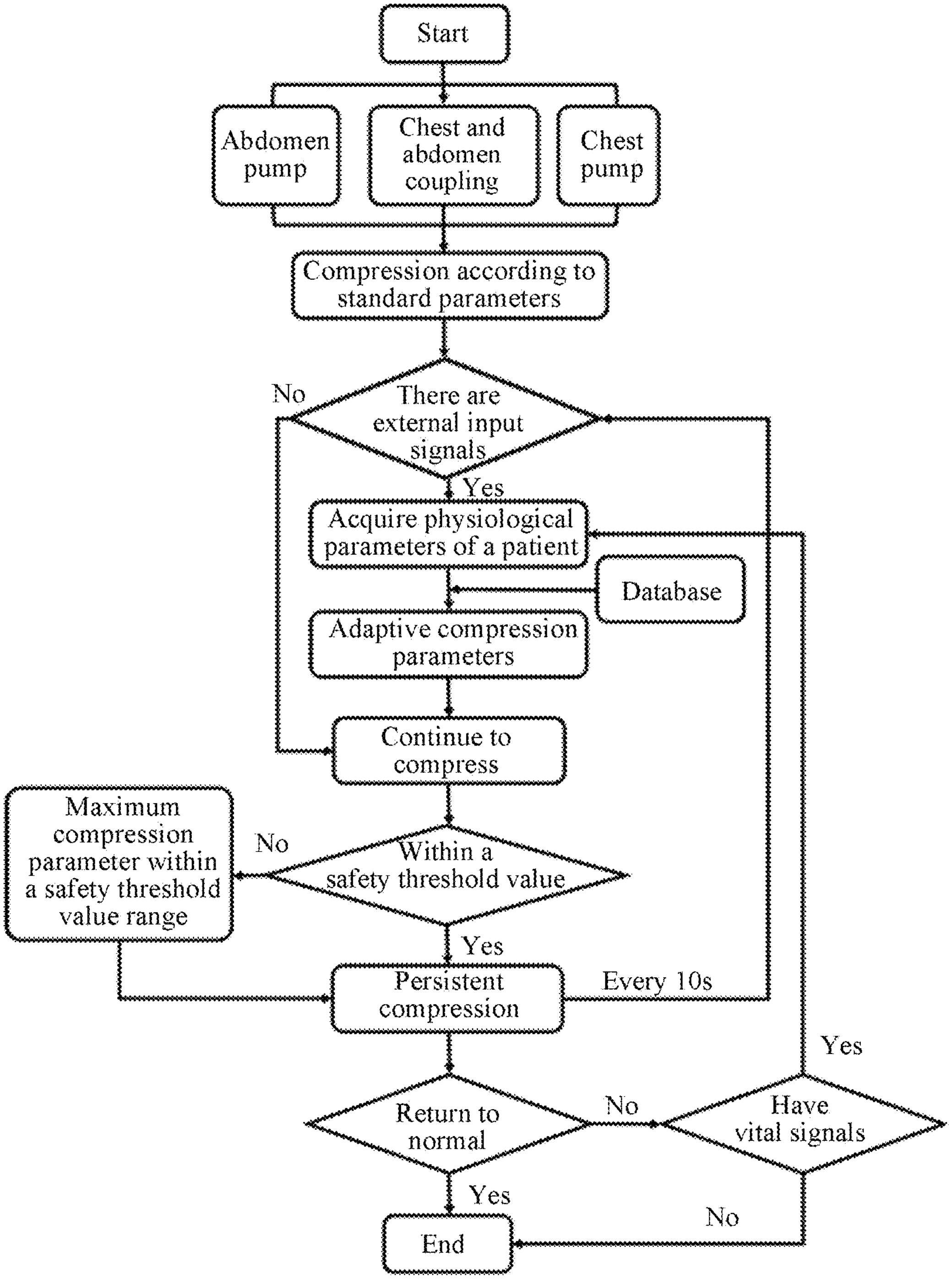
FIG. 6 is a work flow chart of the cardiopulmonary resuscitation device provided by Embodiment 1 of the present disclosure.

As shown in FIG. 6, a working method based on the device above includes the following steps:

(1) the cardiopulmonary resuscitation device is installed, and according to the actual situation of a patient, chest and abdomen coupling is used or only "the chest pump" or "the abdomen pump" is used;

(2) the cardiopulmonary resuscitation device is used for performing compression according to default parameters;

(3) whether there is external signal input is determined, if yes, physiological parameters of the patient are acquired to match with database parameters stored in the device, and the cardiopulmonary resuscitation device is automatically adjusted to compression parameters which are most suitable for the state of a patient at that time; if not, step (5) is performed;

(4) the pressure of a compression surface is calculated according to a pressure value fed back by the pressure sensor and a surface area of the presser, and if the pressure value is within a safety threshold value, a next step is performed; if the pressure value is not within the safety threshold value, after compression is performed according to the maximum compression parameters within the safety threshold value, a next step is performed;

(5) compression is continued, and compression risk determination is performed according to step (4);

(6) step (3) is performed again every 30 seconds;

(7) a professional medical staff (determines by an external signal when there is external input) determines whether the patient returns to normal, and if yes, compression is ended; if not, the professional medical staff checks whether the patient has vital signs, if yes, step (3) is performed, and if not, compression is ended.

The above embodiments are merely preferred embodiments of the present disclosure and are not intended to limit the present disclosure, and various modifications and changes can be made in the present disclosure for those skilled in the art. Any modification, equivalent replacement, or improvement made within the spirit and principle of the present disclosure shall fall within the protection scope of the present disclosure.

What is claimed is:

1. A chest and abdomen coupled cardiopulmonary resuscitation device, comprising: a bottom plate and at least two compression/traction mechanisms, wherein each of the two compression/traction mechanisms comprises two linear motors with opposite positions, the axes of the two linear motors are perpendicular to the bottom plate, and the bottoms of the linear motors are in slip connection with the bottom plate; and the tops of the two linear motors are fixedly connected by a connecting mechanism, the bottom of the connecting mechanism is fixedly provided with a presser connected to an air pump, and the presser can move on the connecting mechanism along a direction perpendicular to a sliding direction of the linear motors;

each compression/traction mechanism comprises a first linear motor and a second linear motor, and the connecting mechanism comprises a first connecting piece, a second connecting piece, a first sliding connecting rod, a second sliding connecting rod and a box body;

a first control terminal is arranged in the box body and is in communication connection with each linear motor, and a pressure sensor is arranged at the bottom of each presser and is in communication connection with the first control terminal; and a second control terminal is arranged on an outer side of the box body and is in communication connection with the first control terminal, databases of hemodynamics, characteristic parameters of various physiological signals and chest and abdomen compression parameters for a plurality of patients with sudden cardiac arrest are integrated in the second control terminal, and when external physiological signals are input, compression parameters most suitable for a current patient can be obtained by comparison with the databases.

2. The chest and abdomen coupled cardiopulmonary resuscitation device according to claim 1, wherein the compression/traction mechanisms at least comprise a first compression/traction mechanism and a second compression/traction mechanism which are arranged in parallel, the first compression/traction mechanism is configured to compress or lift a chest, and the second compression/traction mechanism is configured to compress or lift an abdomen.

3. The chest and abdomen coupled cardiopulmonary resuscitation device according to claim 1, wherein the top of the first linear motor is connected to a first end of the first connecting piece, the top of the second linear motor is connected to a first end of the second connecting piece, a second end of the first connecting piece is connected to one side of the box body through the first sliding connecting rod, and a second end of the second connecting piece is connected to the other side of the box body through the second sliding connecting rod; and the presser is arranged at the bottom of the box body and is communicated with the air pump in the box body.

4. The chest and abdomen coupled cardiopulmonary resuscitation device according to claim 1, wherein the first control terminal is connected to each linear motor through a PWM (Pulse-Width Modulation) governor and is configured to control the speed of each linear motor to be consistent.

5. The chest and abdomen coupled cardiopulmonary resuscitation device according to claim 1, wherein the first control terminal uses a fuzzy adaptive intelligent controller to control the speed of the linear motor.

6. The chest and abdomen coupled cardiopulmonary resuscitation device according to claim 5, wherein a hybrid coding particle swarm optimization algorithm and a monitoring function are combined in the fuzzy adaptive intelligent controller, which comprises the following steps:

collecting an expected speed value and an actual speed value of the linear motor, with the purpose of minimizing a speed tracking error, taking a speed error and the rate of change of the error as the input of the fuzzy controller, and taking the control law as the output of the fuzzy controller; and using the hybrid coding particle swarm optimization algorithm to optimize a membership function, scale factor parameters and fuzzy rule conclusion, and outputting, by the fuzzy controller, control signals to change the speed of the linear motor and control the movement of the linear motor.

7. The chest and abdomen coupled cardiopulmonary resuscitation device according to claim 1, wherein the presser is of a hollow spiral cylindrical structure; when a lifting function is performed, the air pump works, the interior of the presser is under negative pressure, the presser sticks to the chest or abdomen of a patient; and when the lifting force reaches three fifths of the last compression force of the presser, the air pump stops working.

* * * * *